United States Patent Office 3,162,010
Patented Dec. 22, 1964

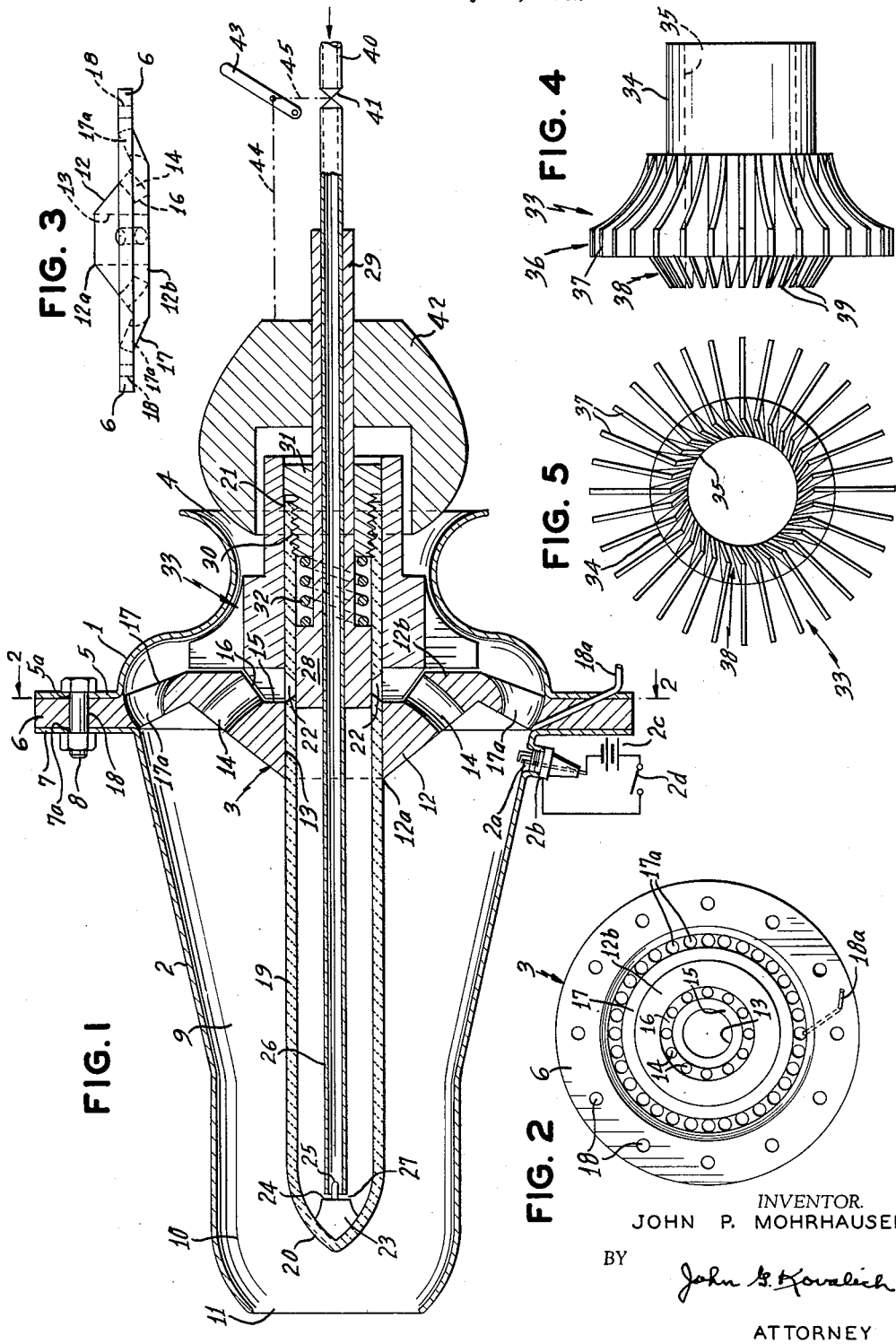

3,162,010
JET ENGINE
John P. Mohrhauser, 804 Prospect St., Maplewood, N.J.
Filed May 29, 1962, Ser. No. 198,536
10 Claims. (Cl. 60—35.6)

The present invention deals with a jet engine and more particularly with a jet engine of simplified construction, minimum of moving parts and capable of operation with a variety of low grade combustible fuels for economy of operation at high efficiency.

Jet engines of the type embodying an ignition and combustion chamber associated with turbine and compresser means generally require complicated internal structural support considerations including multiple moving parts and complicated tortuous conduit means for the feeding, pretreating, and directing of the fuel to the combustion chamber.

It is an object of the present invention to provide an extremely simple jet engine of high efficiency.

It is another object of the invention to provide a jet engine which employs during operation a single rotational member adapted to provide for high efficiency.

It is a further object of the invention to provide a jet engine characterized by simple control means.

It is a still further object of the invention to provide a jet engine having fuel feeding, pretreating and directing means of a construction such that the engine is capable of using low grade combustible fuels with high efficiency.

It is another object of the invention to provide a jet engine of simplified construction such that it may be employed as a power plant for supplying high velocity hot exhaust gases useful for a variety of purposes including use of the engine as a furnace power plant and the like.

Other objects of the invention will become apparent from the description hereinafter following and the drawings forming a part hereof, wherein:

FIGURE 1 illustrates a partly longitudinally cross-sectional and partly elevational view of the jet engine according to the invention, FIGURE 2 illustrates a rear view of an embodiment of the invention along lines 2—2 of FIGURE 1, FIGURE 3 illustrates a side view of FIGURE 2, FIGURE 4 illustrates a side view of another embodiment of the invention, and FIGURE 5 illustrates a rear view of FIGURE 4.

Regarding FIGURE 1 of the drawings, there is provided an outer two-part casing or shell consisting of intake casing 1 and combustion chamber casing 2 interconnected to a channelled gas deflection plate generally indicated as 3 and hereinafter more particularly described.

The intake casing 1 has an inlet opening 4 in the form of a flared bell and an outlet of larger diameter than the inlet 4, the outlet having an annular flange 5 connected to the annular flange 6 of deflection plate 3.

The combustion chamber casing 2 comprises an inlet portion having an annular flange 7 connected to plate flange 6 by means of bolts 8 interconnecting the flanges 5 and 7. The combustion chamber casing is of progressively reduced diameter for a substantial distance forwardly of the deflection plate 3 and encompasses a combustion chamber 9. The combustion chamber casing 2 terminates into an exhaust portion 10 of substantially pipe-like configuration and terminating in exhaust opening 11.

The gas deflection plate 3 as illustrated in FIGURES 1, 2 and 3 comprises a central portion 12 in the form of a frustum having apex 12a, base 12b and an axial bore 13 therethrough and with a plurality of circumferentially spaced deflection channels 14 radially spaced from the bore 13. The base 12b its provided with a circular recess 15 having bevelled walls 16 between the base surface of the recess surface, and the channels 14 communicate with the recess 15 through the bevelled walls 16. An intermediate annular plate portion 17 circumscribes and extends angularly outwardly of the central portion 12 and is angularly disposed in the direction of the apex 12a and merges with the annular flange 6 which extends outwardly of the intermediate portion 17 in a direction normal to the axis of bore 13. The intermediate plate portion 17 is provided with a plurality of circumferentially spaced deflection channels 17a formed therethrough. The axes of the deflection channels 14 and 17a are so disposed relative to each other that they form theoretical acute angles having apexes in the combustion chamber. Circumferentially spaced bores 18 are formed through flange 6 for cooperating with the mounting bolts 8 shown in FIGURE 1.

An ignition fuel line 18a passes through the flange 6 and into combustion chamber 9 through an angular bore formed through the flange. The ignition fuel line preferably terminates in the combustion chamber in proximity to deflection channel 17a and the combustion chamber casing wall as illustrated by FIGURES 1 and 2.

The combustion chamber casing is provided with an aperture 2a and a glow plug or spark plug 2b is effectively mounted in the aperture. The aperture and spark plug are located so that the flow plug electrode or spark gap of the spark plug is in close proximity to the terminal of the ignition fuel line internally of the combustion chamber. The spark plug or glow plug is electrically energized by a suitable source of electrical energy 2c through switch 2d.

Having provided the gas deflection plate 3 as described above, the combustion chamber casing 2 and intake casing 1 are assembled with their respective casing flanges 7 and 5 in abutment with opposite sides of the plate flange 6. The casing flanges are provided with apertures 7a and 5a which are positioned to register with bores 18 and the bolts 8 thereby pass through the combined flanges to fix the casings to the plate 3.

Having assembled the deflection plate and casings, an elongated refractory tube 19 having a closed end 20 is suitably mounted in the bore 13 of plate 3 with the closed end 20 passing through the bore 13 and directed toward exhaust opening 11, and its open end 21 extending rearwardly of the plate 3. The tube 19 is provided with a plurality of circumferentially spaced apertures 22 in a plane normal to the tube axis. The tube 19 is fixedly positioned in bore 13 in a manner such that the apertures 22 communicate with the central recess 15 in base 12b.

The inner surface of the closed end 20 of tube 19 is provided with a deflector member 23 having a deflector surface 24 facing the open end 21 of tube 19. A lug 25 extends outwardly of the deflector surface 24. An open ended elongated fuel conduit 26 is mounted into and coaxially of tube 19 with its open end portion 27 mounted on lug 25 and spaced from deflection surface 24, the fuel conduit and lug being so mounted as to admit egress of liquid fuel therebetween.

A hollow piston member having a piston head 28, dimensioned to promote piston performance in cooperation with tube 19, and an elongated shank 29, is slidably positioned over fuel conduit 26 in piston surface contact with the inner surface of tube 19. The axial hollow passage in the piston member extends through the head and shank and is dimensioned to slidably operate in cooperation with fuel conduit 26. The open end of tube 19 is internally threaded as at 30. An externally threaded retaining nut 31 is dimensioned to cooperate with the threaded end 21 of tube 19 and is threadedly engaged with the end 21 with a spring member 32 positioned on shank 29 between piston head 28 and retaining nut 31.

Having assembled the structure heretofore described, a unitary compressor-turbine unit according to the invention and generally designated as 33 is mounted on refractory tube 19 as illustrated in FIGURE 1. The compressor-turbine unit is more particularly illustrated in FIGURES 4 and 5.

Referring to FIGURES 4 and 5, the compressor-turbine unit 33 is provided as a generally tubular member, having a hollow elongated core 34 provided with an axial bore 35 and mounted substantially at one end thereof a compressor member 36 comprising a plurality of radially extending circumferentially spaced compressor blades 37. The compressor blades 37 are each substantially L-shaped with the L-leg and L-base merging on one side in a concave arc with the base extending partly along the core 34, and the leg side being substantially perpendicular, as illustrated in FIGURE 1. A turbine member 38 is mounted in abutment with the compressor member and is preferably integral therewith. The turbine 38 is provided with a plurality of circumferentially spaced turbine blades 39 angularly disposed relative to the compressor blades and extending in a direction opposite to the base of the L-shaped compressor blades. The turbine blades are shaped to substantially mate with the bevelled walls of the recess 15 of gas deflection plate 3 hereinbefore described.

Having provided the compressor-turbine assembly, the unit is rotatably mounted on refractory tube 19, the tube 19 being mounted in bore 35, with the turbine member 38 mounted in mated relationship in deflection plate recess 15 and the compressor blades facing the plate base 12b with the arcuate portion thereof facing the convex internal surface of the bell-shaped intake casing 1.

The compressor-turbine assembly is retained in the above-described position by any suitable retaining means.

In operation with reference to FIGURE 1, the combustion chamber 9 is primed for combustion by passing an ignition combustible fluid from a suitable source through the ignition fuel line 18a into the combustion chamber. The ignition fuel is ignited by the spark plug 2a and combustion is maintained whereby the refractory tube 19 is preheated. When tube 19 is sufficiently heated, pressurized liquid fuel of any suitable type is pumped and passed or injected into fuel conduit 26 from any suitable source. The injected and pressurized fuel passes outwardly of the open end 27 of fuel line 26 against the deflection surface 24 of deflector 23, whereby the liquid by impact against surface 24 is transformed into a spray or is otherwise thereby atomized and passes into refractory tube 19. In its sprayed or atomized state, the fuel is substantially instantaneously vaporized and cracked with attendant substantially high vapor pressure as a result of the heat provided by the pre-heated tube 19. The fuel vapor pressure built up in tube 19 forces the piston head 28 in tube 19 rearwardly and exposes the apertures 22 to the action of the vaporized fuel. The hot fuel vapor passes into the recess 15 and into engagement with the turbine blades 39 which causes the blades to rotate on tube 19 and to pass the hot gases or vapors into and through the gas deflection channels 14 into combustion chamber 9. Simultaneously, since the turbine 38 is fixed relative to compressor 36, the compressor also rotates, draws air into the intake chamber through inlet 4 and compresses the air which is forced through the gas deflection channels 17a into combustion chamber 9 simultaneously with the fuel gas. As a result of the hereinabove described angular positioning of the deflector channels relative to each other, the fuel gas and air are immediately mixed in a combustible mixing and mixed with the burning ignition gases, whereupon the operational fuel and air mixture is ignited by the ignition gases in chamber 9 and carry on combustion at a highly increased rate and whereby the combustion gases are expelled through exhaust portion 10 and exhaust opening 11 with high velocity. Upon ignition of the operational gas vapor fuel with attendant highly increased rate of combustion, the ignition fuel 18a is closed and switch 2d is closed and the high operational combustion in chamber 9 is maintained by virtue of its own combustion reaction. Exhaust velocity and attendant engine thrust is controlled by the simple expedient of regulating the volume of fuel entering fuel line inlet 40 by means of a fuel valve 41 and by regulating the volume and velocity of air admitted into the compressor casing of intake casing 1. The air may be controlled by means of a valve member 42 mounted on piston shank 29 in axially movable relationship therewith. Both the control of air and fuel may be simultaneously regulated by means of a throttle 43 interconnected with the fuel valve 41 and air valve 42 by means of any suitable linkage 44 and 45. The air valve may be of the ball valve type, as illustrated in FIGURE 1, whereby its movement relative to the intake opening 4 causes the intake air to be peripherally directed into intake casing 1 along the walls of the intake throat and thereby conducted therealong into direct engagement with the compressor blades 37, which have been heated by conduction from turbine 38. In this manner the efficiency of combustion is increased since the air passing through the compressor blades are preheated prior to entry into the combustion chamber.

Various modifications of the invention are contemplated within the scope of the appended claims.

What is claimed is:

1. A jet engine comprising a casing having an inlet and outlet, a first tubular member having a closed end and an open end, the first tubular member being mounted in and longitudinally of the casing with its closed end directed toward the casing outlet, a second tubular member mounted in the first tubular member, the second tubular member having an open end positioned adjacent the closed end of the first tubular member and another end extending outwardly of the first tubular member, a plurality of circumferentially spaced outlet means through the wall of the first tubular member, pressure responsive closure means for the outlet means located within the first tubular member, means for passing fuel through the second tubular member and through the outlet means of the first tubular member, turbine means located adjacent the outlet means, and means for selectively directing the fuel from the first tubular member outlet means in fuel receiving relationship with the turbine means and into the casing.

2. A jet engine comprising a longitudinal casing having an inlet and outlet, a plate member mounted in the casing intermediate the inlet and outlet and positioned transversally of the casing axis, a bore through the plate directed longitudinally of the casing, channel means through the thickness of the plate and spaced from the plate bore, a first tubular member having a closed end and an open end, the first tubular member being mounted in the plate bore with its closed end extending outwardly of the plate toward the casing outlet, a second tubular member mounted in the first tubular member, the second tubular member having an open end positioned substantially adjacent the closed end of the first tubular member and another end extending outwardly of the first tubular member, a plurality of circumferentially spaced outlet means through the wall of the first tubular member, pressure responsive closure means for the outlet means located within the first tubular member, means for passing fuel through the second tubular member into the first tubular member into the first tubular member and through the outlet means of the first tubular member, turbine means located adjacent the outlet means, and means for directing fuel from the first tubular member outlet means in fuel receiving relationship with the turbine means and through said plate channel means in the direction of the casing outlet.

3. A jet engine according to claim 1, comprising fuel deflector means in the first tubular member at the closed end thereof, the deflector means being spaced from the open end of the second tubular member positioned in said first tubular member.

4. A jet engine according to claim 1, wherein said second tubular member is concentrically spaced from said first tubular member.

5. A jet engine according to claim 1, wherein said closure means comprises a piston means slidably mounted on said second tubular member and positioned in said tubular member.

6. A jet engine according to claim 2 wherein said channel means comprises a first plurality of circumferentially spaced channels about the plate borne and radially spaced therefrom, and a second plurality of circumferentially spaced channels about the plate bore and radially radially spaced from the plate bore at a greater distance than the first plurality.

7. A jet engine according to claim 6, wherein said first plurality and second plurality are angularly spaced toward each other at an acute angle in the direction of the casing outlet.

8. A jet engine comprising a casing having an inlet and outlet, a first tubular member having a closed end and an open end, the first tubular member being mounted in and longitudinally of the casing with its closed end directed toward the casing outlet, a second tubular member mounted in the first tubular member, the second tubular member having an open end positioned adjacent the closed end of the first tubular member and another end extending outwardly of the first tubular member, a plurality of circumferentially spaced outlet means through the wall of the first tubular member, pressure responsive closure means for the outlet means located within the first tubular member, means for passing fuel through the second tubular member and through the outlet means of the first tubular member, a compressor-turbine unit comprising a tubular core with turbine means at one end thereof and compressor means fixed to the turbine means, the unit being rotatably mounted on said first tubular member and the turbine means being positioned in fuel receiving relationship relative to the outlet means of said first tubular member.

9. A jet engine according to claim 6, comprising a compressor-turbine unit having a tubular core, with said turbine means at one end thereof and compressor means fixed to the turbine means, the unit being rotatably mounted on said first tubular member with the turbine means being positioned adjacent the first plurality of channels and the compressor means being positioned substantially adjacent the second plurality of channels.

10. A jet engine according to claim 9, comprising valve means positioned adjacent the casing inlet and operative to regulate the flow of air into said inlet.

References Cited in the file of this patent
UNITED STATES PATENTS

| | | |
|---|---|---|
| 2,443,707 | Korsgren | June 22, 1948 |
| 2,483,045 | Harby | Sept. 27, 1949 |
| 2,864,236 | Toure | Dec. 16, 1958 |
| 2,868,127 | Fox | Jan. 13, 1959 |
| 2,916,367 | Stokes | Dec. 8, 1959 |
| 2,939,281 | Conyers | June 7, 1960 |
| 2,958,189 | Britton et al. | Nov. 1, 1960 |